United States Patent
Tsutsui

(10) Patent No.: US 12,445,072 B2
(45) Date of Patent: Oct. 14, 2025

(54) AIR COMPRESSOR

(71) Applicant: MAX CO., LTD., Tokyo (JP)

(72) Inventor: Tomohide Tsutsui, Tokyo (JP)

(73) Assignee: Max Co., Ltd., Tokyo (JP)

( * ) Notice: Subject to any disclaimer, the term of this patent is extended or adjusted under 35 U.S.C. 154(b) by 105 days.

(21) Appl. No.: 18/216,238

(22) Filed: Jun. 29, 2023

(65) Prior Publication Data

US 2024/0007037 A1 Jan. 4, 2024

(30) Foreign Application Priority Data

Jul. 4, 2022 (JP) ................................. 2022-107496

(51) Int. Cl.
| | |
|---|---|
| *H01M 8/04089* | (2016.01) |
| *F15B 15/14* | (2006.01) |
| *F15B 15/18* | (2006.01) |
| *H02K 11/215* | (2016.01) |
| *H02K 11/25* | (2016.01) |
| *H02K 21/22* | (2006.01) |
| *H02P 21/18* | (2016.01) |
| *H02P 21/22* | (2016.01) |

(52) U.S. Cl.
CPC .......... *H02P 21/18* (2016.02); *F15B 15/1447* (2013.01); *F15B 15/18* (2013.01); *H02K 11/215* (2016.01); *H02K 11/25* (2016.01); *H02K 21/22* (2013.01); *H02P 21/22* (2016.02); *H02P 2207/055* (2013.01)

(58) Field of Classification Search
CPC .... H02P 21/18; H02P 2207/055; H02P 23/26; H02K 11/215; H02K 21/04; F15B 15/18
See application file for complete search history.

(56) References Cited

U.S. PATENT DOCUMENTS

| | | | |
|---|---|---|---|
| 8,616,016 B2 | 12/2013 | Asano et al. | |
| 2010/0090640 A1* | 4/2010 | Maekawa | H02K 21/04 |
| | | | 310/156.03 |
| 2016/0001624 A1 | 1/2016 | Meissner et al. | |
| 2018/0156217 A1 | 6/2018 | Sakima et al. | |
| 2020/0144643 A1* | 5/2020 | Kim | H01M 8/04089 |
| 2020/0208884 A1 | 7/2020 | Le Bordays et al. | |
| 2020/0259439 A1* | 8/2020 | Yoshino | H02P 23/26 |
| 2020/0325890 A1 | 10/2020 | Okubo et al. | |

(Continued)

FOREIGN PATENT DOCUMENTS

| | | |
|---|---|---|
| CN | 204559353 U | 8/2015 |
| CN | 110617196 A | 12/2019 |
| CN | 111379689 A | 7/2020 |

(Continued)

OTHER PUBLICATIONS

Dec. 7, 2023—(EP) Extended Search Report—EP App 23182486.3.
May 8, 2025—(EP) Communication under Rule 71(3), Notice of Grant—EP App 23182486.3.

*Primary Examiner* — Cortez M Cook
(74) *Attorney, Agent, or Firm* — Banner & Witcoff, Ltd.

(57) ABSTRACT

An air compressor includes: a motor configured to drive a compression mechanism for compressing air, and a controller configured to control the motor. The motor is an outer rotor motor including a stator and a rotor disposed on an outer side of the stator. The controller is configured to adjust a voltage applied to a stator winding of the stator, based on position information of the rotor.

8 Claims, 11 Drawing Sheets

(56) References Cited

U.S. PATENT DOCUMENTS

2021/0249931 A1* 8/2021 Uchida ................. H02K 5/161

FOREIGN PATENT DOCUMENTS

| JP | H08-338369 A | 12/1996 |
| JP | 2014-029140 A | 2/2014 |
| JP | 2020-174502 A | 10/2020 |
| KR | 20120137899 A | 12/2012 |
| KR | 2015-0122218 A | 10/2015 |

* cited by examiner

AIR COMPRESSOR

CROSS-REFERENCE TO RELATED APPLICATIONS

This application is based on Japanese Patent Application No. 2022-107496 filed on Jul. 4, 2022, the contents of which are incorporated herein by way of reference.

TECHNICAL FIELD

The present invention relates to an air compressor.

BACKGROUND ART

In construction sites and the like, a pneumatic tool using compressed air as drive energy is used to perform operations such as cutting, nailing, and screwing. As the pneumatic tool, an air driver and a nailer that strikes a fastener such as a staple, a pin, a screw, and a nail are known, and an air compressor supplies compressed air to such a pneumatic tool.

A general air compressor adopts a so-called reciprocating compression mechanism in which rotational motion of a motor is converted into reciprocating motion of a piston in a cylinder via a crankshaft and air sucked from an intake valve of the cylinder is compressed by the reciprocating motion of the piston. The compressed air compressed in the cylinder is discharged from a discharge valve of the cylinder to a tank via a pipe and stored in the tank. A user can operate a pressure reducing valve for adjusting a pressure when taking out the air from the tank by operating a pressure adjusting dial. The compressed air that has reached a desired pressure through the operation of the pressure reducing valve is supplied to an external pneumatic tool from a compressed air supply port.

Since the air compressor that generates compressed air for driving a pneumatic tool needs to be portable, it is desirable for the air compressor to be compact and lightweight. In addition, in order to improve operating efficiency, it is required to increase a discharge amount of the compressed air. Therefore, for the purpose of miniaturizing the air compressor or improving compression efficiency, a technology of adopting a motor using an outer rotor has been suggested now (refer to Patent Literatures 1 and 2). In recent years, a technology for increasing a discharge amount in a low pressure region by changing a TN characteristic (characteristic representing a relationship between torque and a number of rotations) of a motor by field weakening control has also been suggested (refer to Patent Literature 3).

Patent Literature 1: JP2014-29140A
Patent Literature 2: JPH08-338369A
Patent Literature 3: JP2020-174502A In order to improve the compression efficiency of the air compressor (i.e., to increase the discharge amount), it is effective to increase the number of rotations. However, since noise increases, it is not a desirable countermeasure, considering the use in construction sites. On the other hand, in order to increase the discharge amount without increasing the number of rotations, it is known that it is effective to increase a cylinder diameter or cylinder stroke or to suppress leakage by closing a gap in the cylinder. However, if an attempt is made to increase the discharge amount with such a means, since not only it is necessary to generate high torque in a motor that drives the compression mechanism, but also a range of load variation increases, stable rotation is not obtained, such as a drop in rotating speed. In addition, if an attempt is made to generate high torque in a situation where current is limited to suppress current from a power supply within a predetermined upper limit value, the current reaches the upper limit value even without increasing the number of rotations of the motor, and as a result, the discharge amount cannot be increased. Furthermore, since motor drive current increases as load applied to the motor increases, there occurs a problem in that the electromagnetic force in the motor increases, resulting in an increase in generated sound.

Thus, the air compressor has problems that when it is intended to increase the discharge amount, the generated sound increases and the motor rotation becomes unstable. However, the technologies of the related art described in Patent Literatures 1 to 3 cannot solve such problems.

That is, if the outer rotor motor as described in Patent Literatures 1 and 2 is adopted, it is possible to increase the inertia of a rotating system. However, since a rotor part with a large area becomes a main sound-generating part in the outer rotor, the sound is likely to be generated more. In addition, in many cases, aluminum or thin iron with low rigidity is used for a rotor plate, so the generated sound is likely to be loud. On the other hand, the technology as described in Patent Literature 3 is effective only in the low pressure region, cannot increase the discharge amount in a current-limited region of the high pressure region, and increases the number of rotations in the low pressure region, so that the generated sound becomes loud.

The present invention has been made in view of the above situations, and an object of the present invention is to suppress generated sound while increasing a discharge amount of an air compressor.

SUMMARY OF INVENTION

A first air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to adjust a voltage applied to a stator winding of the stator, based on position information of the rotor. A waveform of current flowing through the stator winding is substantially a sinusoidal waveform.

A second air compressor according to the present invention includes a motor configured to drive a compression mechanism for compressing air, and a controller configured to control the motor, in which the motor is an outer rotor motor including a stator and a rotor disposed on an outer side of the stator, and in which the controller includes a detection circuit configured to detect induced current flowing through a stator winding of the stator and is configured to adjust a voltage applied to the stator winding, based on the induced current detected by the detection circuit. A waveform of current flowing through the stator winding is substantially a sinusoidal waveform.

A third air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to separate current flowing through a stator winding of the stator into a current component for generating rotating torque and a current component for generating a magnetic flux in the rotor, and is configured to adjust the current components independently. In this case, the controller may be configured to adjust a voltage applied to the stator winding, based on position information of the rotor. A waveform of current flowing through the stator winding is substantially a sinusoidal waveform.

A fourth air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to control the motor by vector control.

In the first to third air compressors of the present invention, the controller can be configured to estimate the position information, based on induced current flowing through the stator winding. In the fourth air compressor according to the present invention, the controller can be configured to perform sensorless control of estimating a position of the rotor, based on a voltage and current of the motor.

In the first to fourth air compressors according to the present invention, a position sensor configured to detect a position of the rotor and to output a detection position signal may be provided. In this case, the controller can be configured to correct the position information (or an estimated position of the rotor), based on the detection position signal output from the position sensor.

In the first to fourth air compressors according to the present invention, a temperature sensor configured to detect a temperature of the motor and to output a temperature signal may be provided. In this case, the controller can be configured to correct the position information (or an estimated position of the rotor), based on the temperature signal output from the temperature sensor.

In the first to fourth air compressors according to the present invention, the rotor may have a permanent magnet, and at least a part of the permanent magnet may be made from a neodymium magnet.

In the first to fourth air compressors according to the present invention, a dimension of an outermost diameter of the rotor may be set within a range of 110 mm to 160 mm.

DESCRIPTION OF EMBODIMENTS

Figure 1:
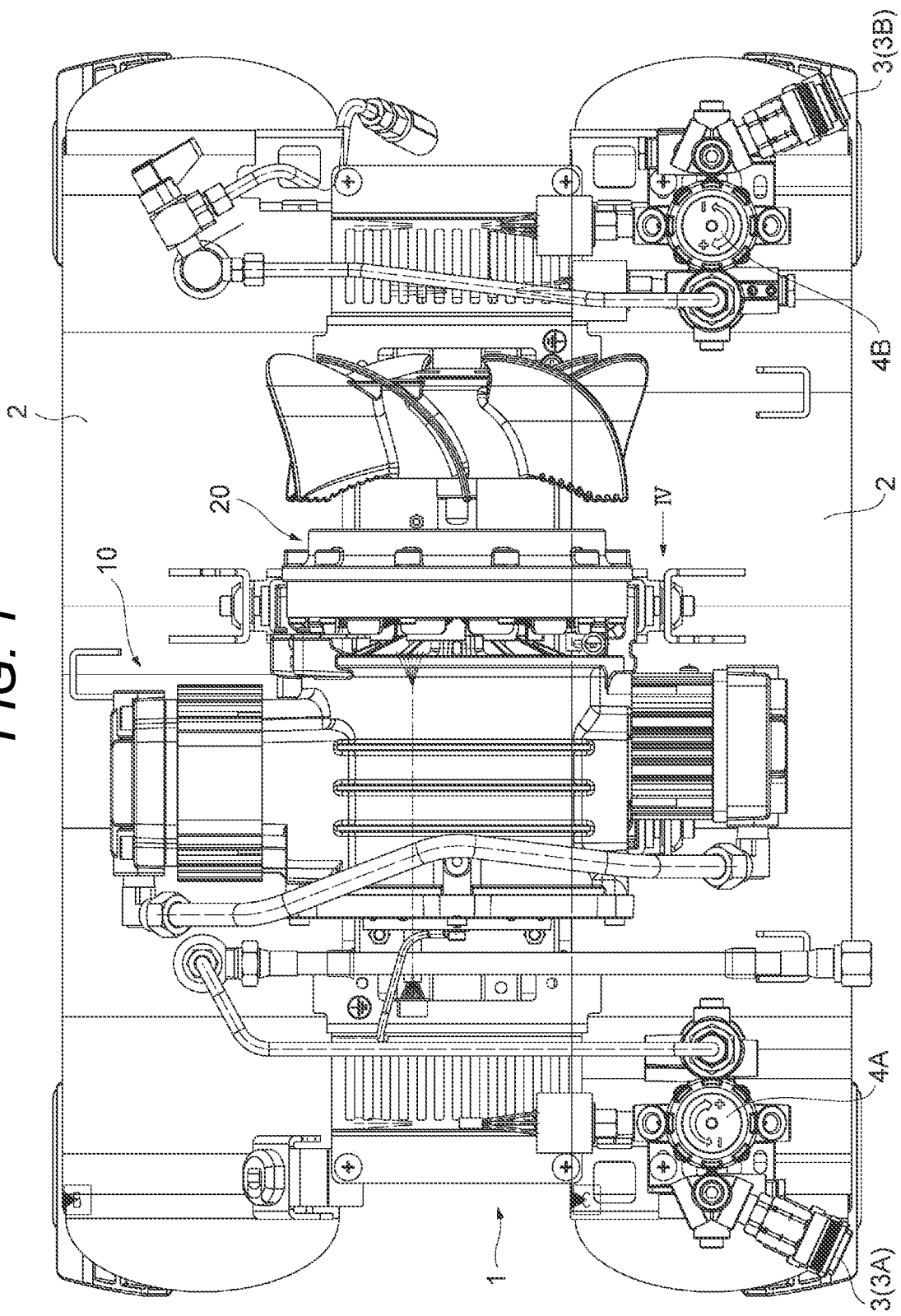
FIG. 1 is a plan view showing an example of an external configuration of an air compressor according to an embodiment of the present invention.

Hereinafter, embodiments of the present invention will be described with reference to the drawings. In addition, the following embodiments are only favorable application examples, and the application scope of the present invention is not limited thereto.

<Overall configuration of Air Compressor>

First, an overall configuration of a compressor 1 according to an embodiment of the present invention will be described using FIGS. 1 to 10. The air compressor 1 according to the present embodiment is configured to supply compressed air to a pneumatic tool connected to the air compressor, and includes a tank 2 (refer to FIGS. 1 and 10) for storing compressed air, a compression mechanism 10 (refer to FIGS. 1, 2, 4 to 6, and 8 to 10) that generates compressed air, a motor 20 (refer to FIG. 2, and the like) that drives the compression mechanism 10, a controller 30 (refer to FIG. 10) that controls the motor 20, a housing (not shown) that accommodates the compression mechanism 10 and the like, and the like. Examples of the pneumatic tool may include an air driver, a nailer that strikes a fastener such as a staple, a pin, a screw, and a nail, and the like. A user can lift the air compressor 1 while gripping a grip (not shown) provided on the housing when carrying the air compressor 1, or the like.

Figure 10:
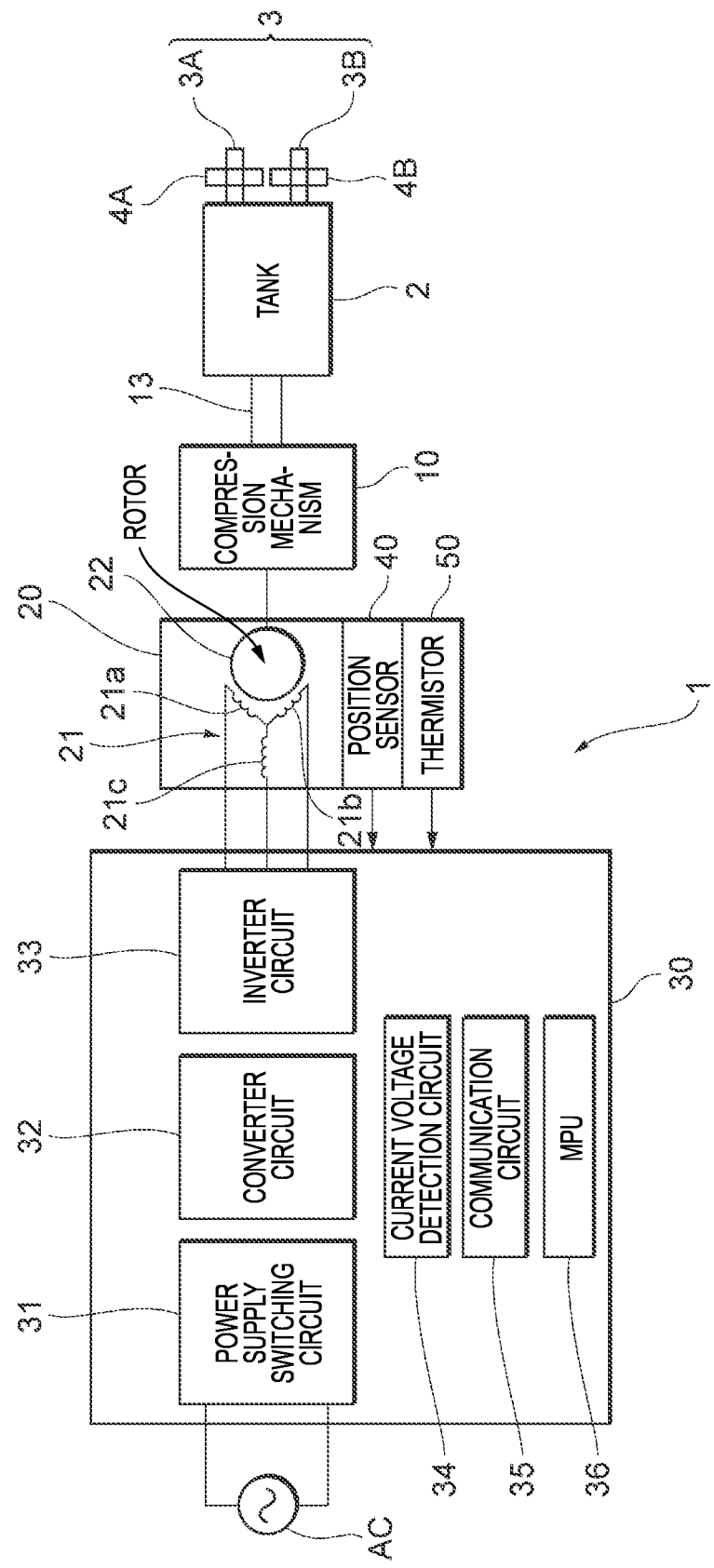
FIG. 10 is a block diagram for illustrating a functional configuration of the air compressor according to the embodiment of the present invention.

The tank 2 is configured to be able to store compressed air having a pressure of 4.4 MPa or lower, for example. As shown in FIGS. 1 and 10, the tank 2 is provided with air chucks (compressed air supply ports) 3A and 3B for supplying the compressed air to the pneumatic tool. The air compressor 1 according to the present embodiment includes an air chuck 3A with a purge mechanism for supplying high-pressure compressed air and an air chuck 3B with a purge mechanism for supplying low-pressure compressed air. Here, the purge mechanism is a mechanism for purging (releasing) residual pressure on an air hose side when separating a plug of the air hose from the air chuck.

The air chucks 3A and 3B with purge mechanisms are each configured such that a hose for supplying the compressed air to the pneumatic tool is detachably mounted thereto. As shown in FIGS. 1 and 10, the air chucks 3A and 3B with purge mechanisms are provided with pressure adjusting dials 4A and 4B for operating pressure adjusting valves, respectively. In addition, the air compressor 1 according to the present embodiment includes an air chuck without a purge mechanism for supplying high-pressure compressed air and an air chuck without a purge mechanism for supplying low-pressure compressed air, which are not shown herein.

Figure 2:
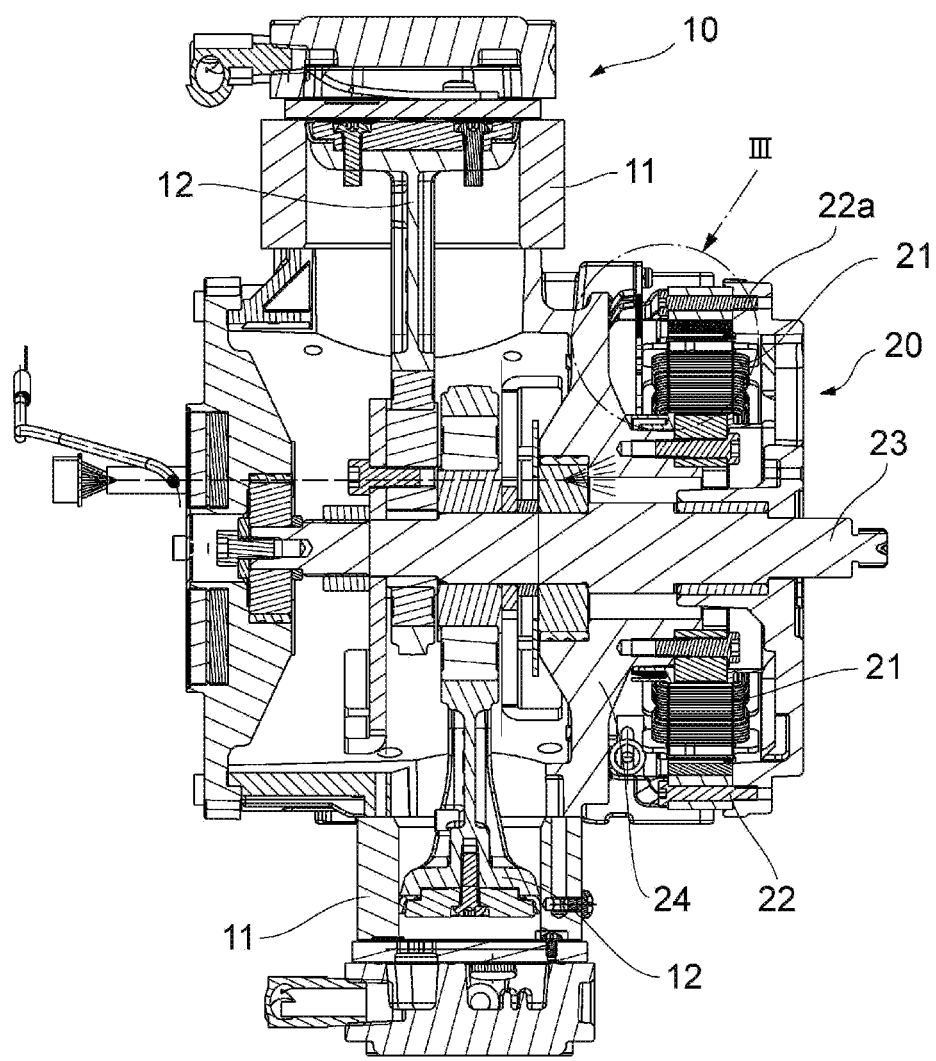
FIG. 2 is a cross-sectional view of a compression mechanism and a motor of the air compressor shown in FIG. 1.
Figure 3:
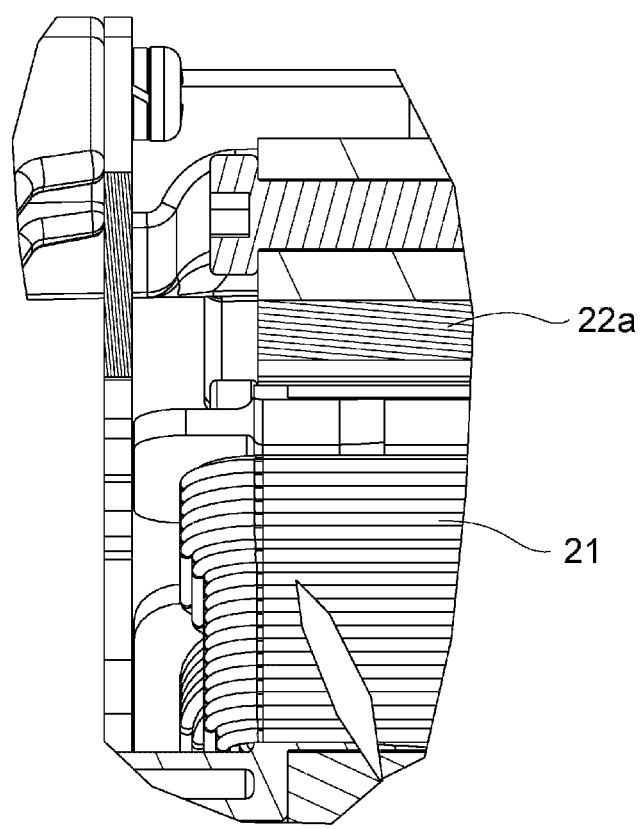
FIG. 3 is an enlarged view of a part III of the motor shown in FIG. 2.
Figure 4:
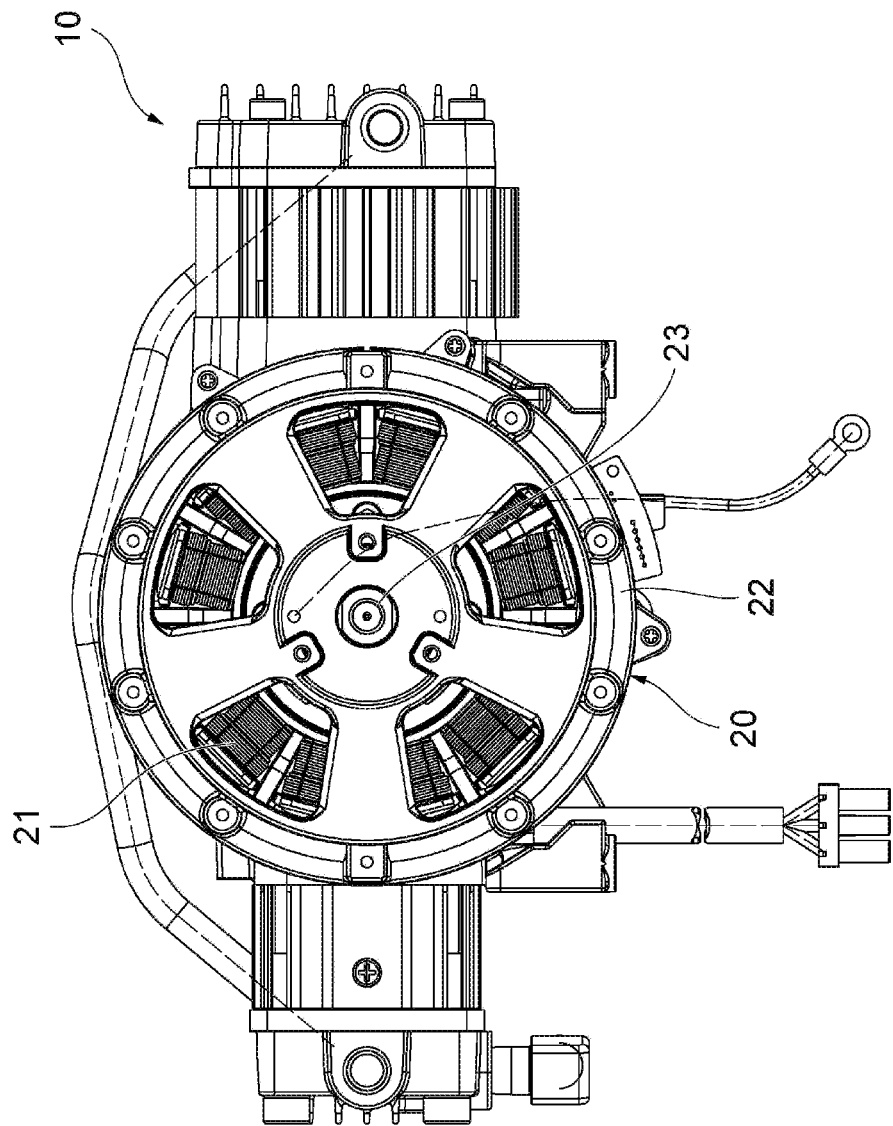
FIG. 4 is a view of the compression mechanism and motor of the air compressor shown in FIG. 1, as seen from an IV direction.
Figure 5:
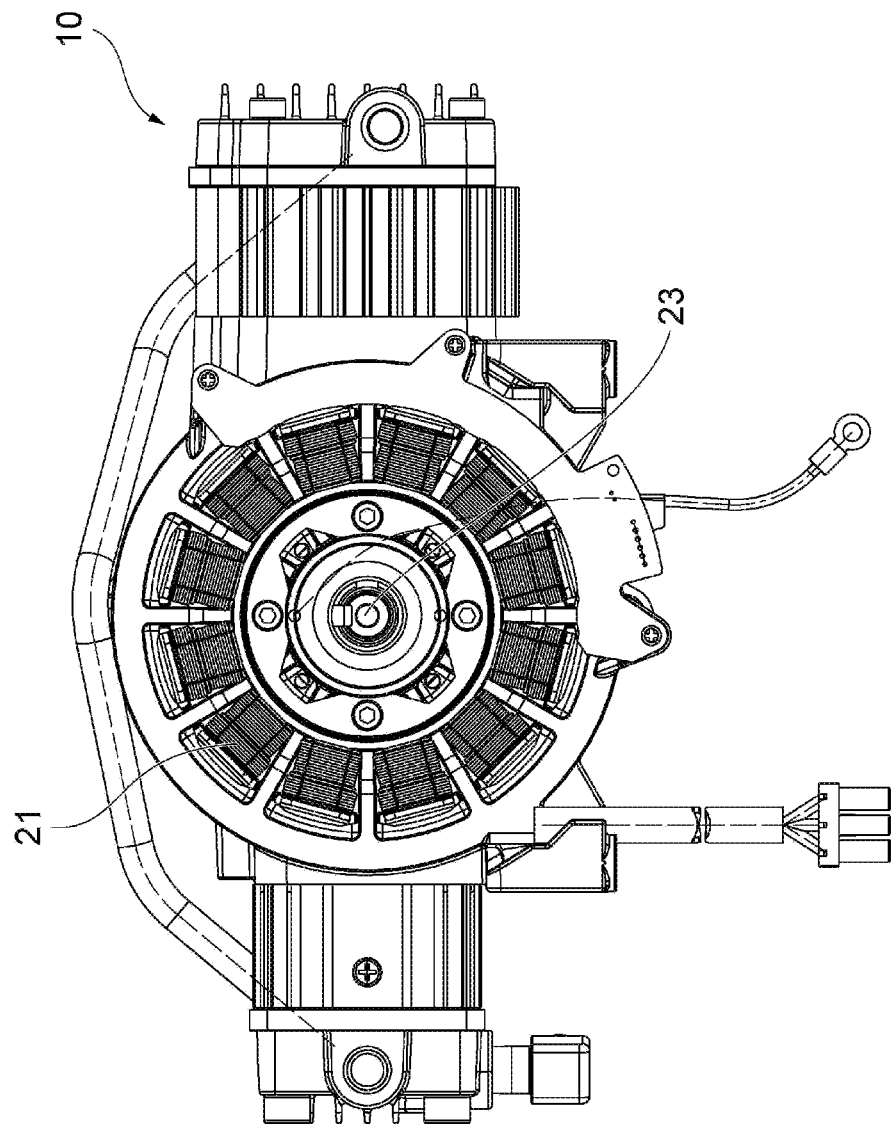
FIG. 5 is a view showing a state in which a stator of the motor shown in FIG. 4 is exposed.
Figure 6:
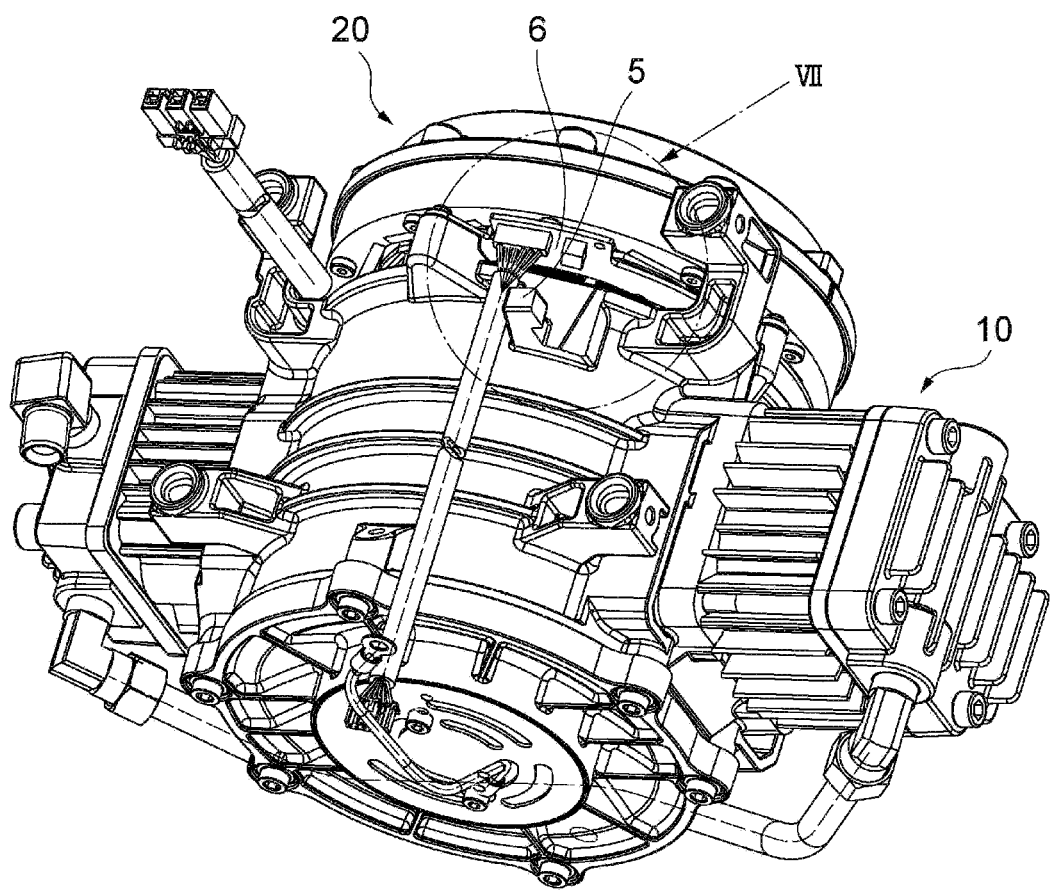
FIG. 6 is a perspective view of the compression mechanism and motor of the air compressor shown in FIG. 1.

The compression mechanism 10 is driven to generate compressed air by the motor As shown in FIG. 2, the compression mechanism 10 has a cylinder 11 and a piston 12 provided in the cylinder 11, and is configured to cause the piston 12 to reciprocate by the motor 20 to compress air supplied into the cylinder 11 from an intake valve of the cylinder 11, thereby generating compressed air. As shown in FIG. 10, the compressed air is supplied to the tank 2 via a connecting pipe 13. The compression mechanism 10 in the present embodiment is a two-stage compression mechanism having a primary cylinder and a secondary cylinder. In the compression mechanism 10, each piston provided inside each of the primary cylinder and the secondary cylinder is connected to a crankshaft 23 rotatably supported by a crankcase 24, and when the crankshaft 23 rotates, each piston reciprocates and the compressed air is generated by the reciprocating movement of each piston. The compression mechanism 10 is configured to generate higher-pressure compressed air by further compressing the air compressed in the primary cylinder with the secondary cylinder. However, the number of pistons included in the compression mechanism 10 is not limited.

The motor 20 generates drive force for reciprocating the piston 12 of the compression mechanism 10. The motor 20 in the present embodiment is a three-phase brushless DC motor, and includes a stator 21 having three-phase stator windings 21a, 21b and 21c (refer to FIG. 10), and a rotor 22 having a permanent magnet 22a and disposed on an outer periphery of the stator 21. That is, the motor 20 in the present embodiment is an outer rotor motor. As a result of rotation of the rotor 22 by a rotating magnetic field formed by current flowing through the three-phase stator windings 21a, 21b and 21c, the piston 12 engaged with the crankshaft 23 (refer to FIG. 2, etc.) connected to a rotary shaft of the rotor 22 reciprocates.

The stator 21 has a configuration in which a stator core and the stator windings 21a, 21b and 21c are integrated by mold resin. The stator core may be configured by, for example, stacking and swaging a plurality of silicon steel sheets, each of which is a punched soft magnetic body, and may have an annular yoke part and a plurality of tooth portions protruding radially from an outer peripheral portion of the yoke part. The stator windings 21a, 21b and 21c have three phases of a U phase, a V phase and a W phase, and may be wound on the respective tooth portions of the stator core. The stator 21 is fixed to the crankcase 24 (refer to FIG. 2) of the housing of the air compressor 1 via a motor housing.

The rotor 22 has a configuration in which a frame, a rotor core, and a plurality of magnets are integrated by mold resin. In this case, the rotor 22 is provided with a plurality of permanent magnets at regular intervals throughout its circumference, and at least a part of the permanent magnets is made from a neodymium magnet. As such, by adopting the neodymium magnet of high magnetic force, it is possible to increase torque by increasing the force acting per an air gap area and to achieve high efficiency. In addition, a dimension of an outermost diameter of the rotor 22 is set within a range of 110 mm to 160 mm. Thereby, inertial energy sufficient to cancel compression load can be obtained while suppressing an increase in size of the air compressor 1.

In the stator 21, a position sensor 40 (refer to FIG. 10) is attached to a position on an end side of the permanent magnet of the rotor 22. The position sensor 40 in the present embodiment is a Hall IC that senses magnetism, and outputs a sensor signal whose level is inverted for each N pole and S pole of the permanent magnet of the rotor 22. According to this configuration, the same number of pulse edges as the permanent magnets appear in the sensor signal output from the position sensor 40, each time the rotor 22 makes one round. The sensor signal output from the position sensor 40 is transmitted to the controller 30, in which it is used to correct an estimated position of the rotor 22.

Further, a thermistor 50 (refer to FIG. 10) as a temperature sensor that detects a temperature of each of the stator winding 21a, 21b and 21c of the stator 21 is attached to each stator winding. A sensor signal output from the thermistor 50 is transmitted to the controller 30, in which it is used to correct an estimated position of the rotor 22. When the temperature of each of the stator windings 21a, 21b and 21c of the stator 21 varies, an inductance, a resistance, a power generation constant, and the like vary, so estimation accuracy of a rotational position of the rotor 22 may be lowered. However, by performing such temperature correction, it is possible to suppress an axis error.

Figure 7:
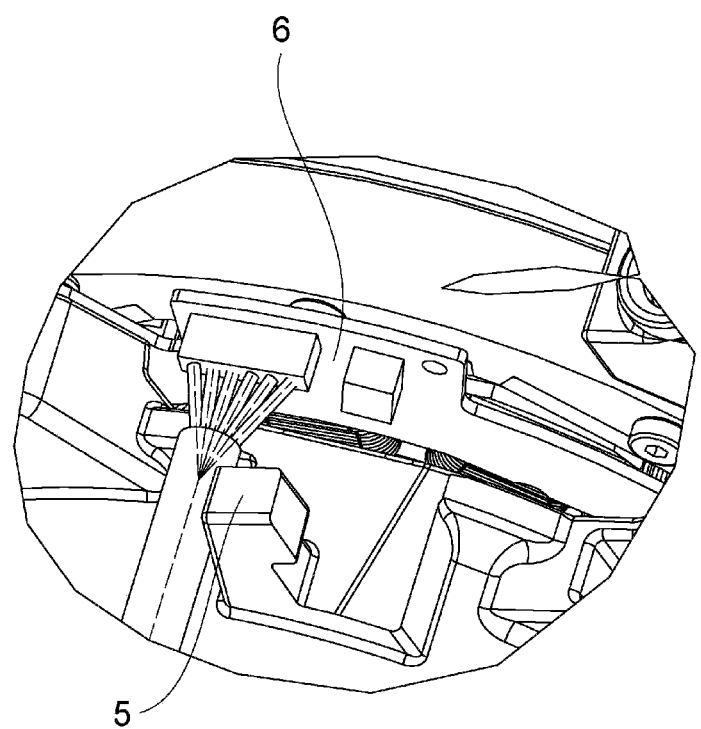
FIG. 7 is an enlarged view of a part VII of the motor shown in FIG. 6.
Figure 8:
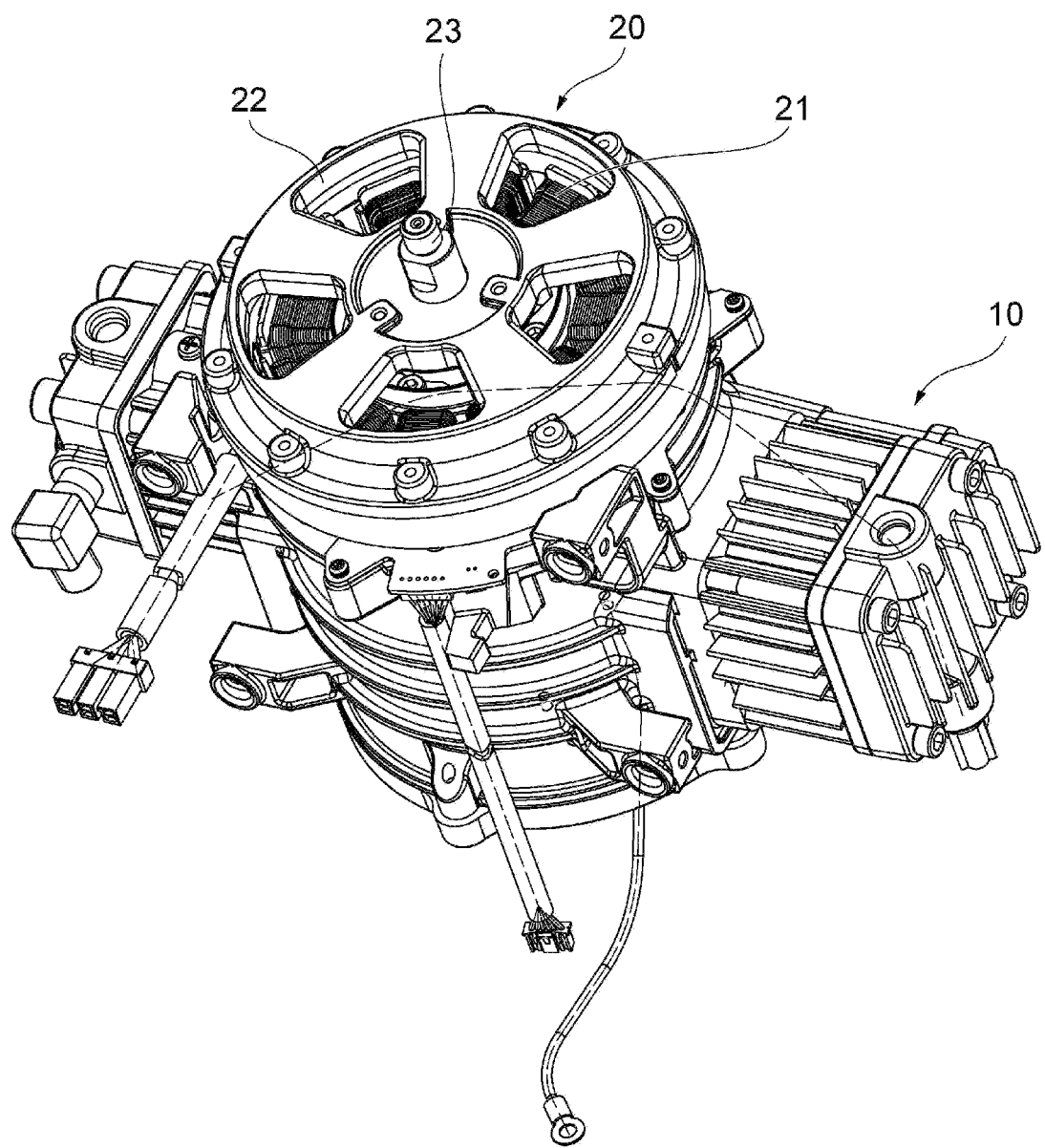
FIG. 8 is another perspective view of the compression mechanism and motor of the air compressor shown in FIG. 1.
Figure 9:
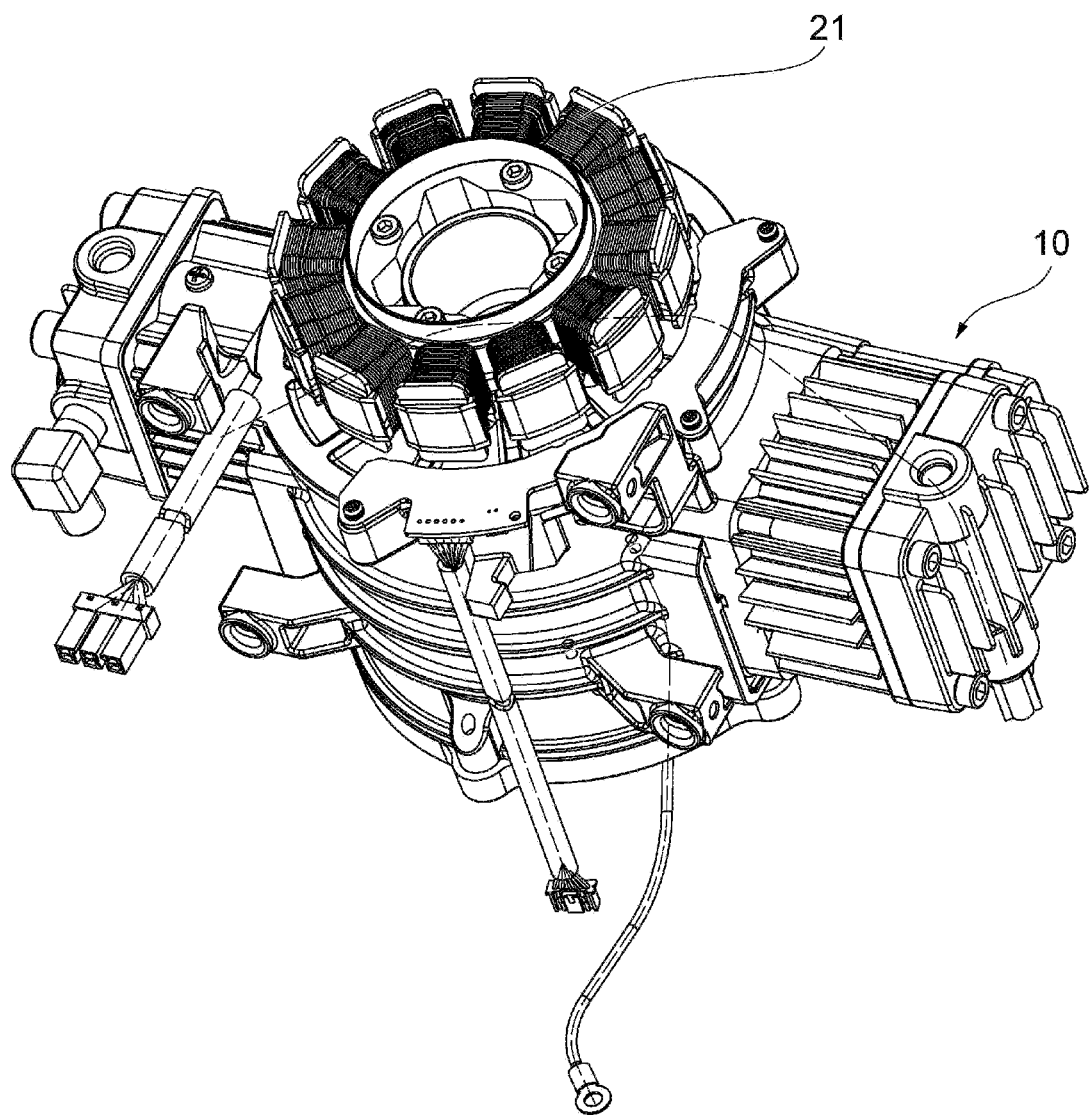
FIG. 9 is a perspective view showing a state in which the stator of the motor shown in FIG. 8 is exposed.

In addition, as shown in FIG. 7, an assembly configured by coupling the compression mechanism 10 and the motor 20 is provided with a protrusion 5. The protrusion is to suppress a substrate 6 protruding from a case member of the motor 20 from contacting another member and being damaged.

The controller 30 collectively controls the various devices of the air compressor 1, and as shown in FIG. 10, includes a power supply switching circuit 31, a converter circuit 32, an inverter circuit 33, a current voltage detection circuit 34, a communication circuit 35, an MPU (Micro Processor Unit) 36, and the like.

The power supply switching circuit 31 switches on/off of power supply from an alternating current power supply (AC) to the converter circuit 32. For example, the power supply switching circuit 31 may include a relay for switching on/off of the power supply from the alternating current power supply (AC) to the converter circuit 32, or a switchable semiconductor element such as FET. The air compressor 1 is not limited to the configuration in which the alternating current power supply (AC) is used as a power supply, and may use a direct current power supply as a power supply. In this case, the power supply switching circuit 31 may be configured to switch on/off of the power supply from the direct current power supply to a circuit in a next stage or the motor 20.

The converter circuit 32 converts the AC power (AC) into DC power having a predetermined voltage and supplies the same to the inverter circuit 33. The converter circuit 32 can adopt a known configuration, and may include, for example, a rectifying circuit including a diode for converting AC voltage to DC voltage, a boosting circuit including a switching element for controlling a voltage of the DC voltage, and a smoothing circuit including a capacitor for smoothing the DC voltage.

The inverter circuit 33 switches the DC power supplied from the converter circuit 32 and supplies the same to the three-phase stator windings 21a, 21b and 21c of the motor 20. The inverter circuit 33 can adopt a known configuration, and includes, for example, a switching element configured by an IGBT (Insulted Gate Bipolar Transistor) or a FET (Field Effect Transistor) connected in a three-phase bridge manner between a power supply line and a ground line. The MPU 36 can perform PWM (Pulse Width Modulation) control by controlling the switching element of the inverter circuit 33.

The current voltage detection circuit 34 includes a current detection circuit and a voltage detection circuit. The current detection circuit is connected to at least one of the three-phase stator windings 21a, 21b and 21c, and detects current flowing through the same. Since the current flowing through the stator windings 21a, 21b and 21c of the motor 20 varies according to a load of the motor 20, the current detection circuit functions to acquire information indicating the load of the motor 20. The MPU 36 can acquire information indicating the load of the motor 20 from the current detection circuit, and control the converter circuit 32 and the inverter circuit 33, based on the information. In addition, the MPU 36 transmits the information indicating the load of the motor 20 to an external terminal device via the communication circuit 35. The voltage detection circuit detects the power supply voltage converted by the converter circuit 32. The MPU 36 can acquire information indicating the power supply voltage from the voltage detection circuit, and control the converter circuit 32 and the inverter circuit 33, based on the information. In addition, the MPU 36 transmits the information indicating the power supply voltage to an external terminal device via the communication circuit 35.

Further, the current detection circuit of the current voltage detection circuit 34 is not limited to the configuration in which the current flowing through the stator windings 21a, 21b and 21c of the motor 20 is detected, and may adopt, for example, a configuration (three-shunt resistor method) in which three shunt resistors are arranged between the switching element on a lower arm side configuring the inverter circuit 33 and the ground and in which the current is detected based on their terminal voltages, a configuration (one shunt resistor method) in which the current is detected based on a terminal voltage of a common (one) shunt resistor, or the like.

The communication circuit 35 transmits information to and receives information from an external terminal device through wireless communication. The wireless communication preferably complies with technical standards such as Bluetooth (registered trademark) communication standards, wireless LAN communication standards, and Zigbee (registered trademark) communication standards, for example. The communication circuit 35 includes an interface circuit for transmitting information to and receiving information from an external terminal device, for example, according to Bluetooth communication standard. In addition, although the controller 30 equipped with the communication circuit 35 has been exemplified in the present embodiment, the communication circuit 35 may also be separated from the controller 30.

The MPU 36 controls functions of the air compressor 1 by controlling the power supply switching circuit 31, the converter circuit 32, the inverter circuit 33, and the like. The MPU 36 can switch on/off of the power supply from the alternating current power supply AC to the converter circuit 32 by controlling the power supply switching circuit 31. Specifically, for example, the MPU 36 can control on/off of a relay and a switchable semiconductor element (such as a FET) of the power supply switching circuit 31. In addition, the MPU 36 can perform PAM (Pulse Amplitude Modulation) control by controlling the switching element of the boosting circuit of the converter circuit 32. Further, the MPU 36 can transmit load information and power supply voltage information to an external terminal device via the communication circuit 35, and control the motor 20, based on various types of information received from the external terminal device via the communication circuit 35. Further, the MPU 36 may control a predetermined display unit.

<Motor Control>

Figure 11:
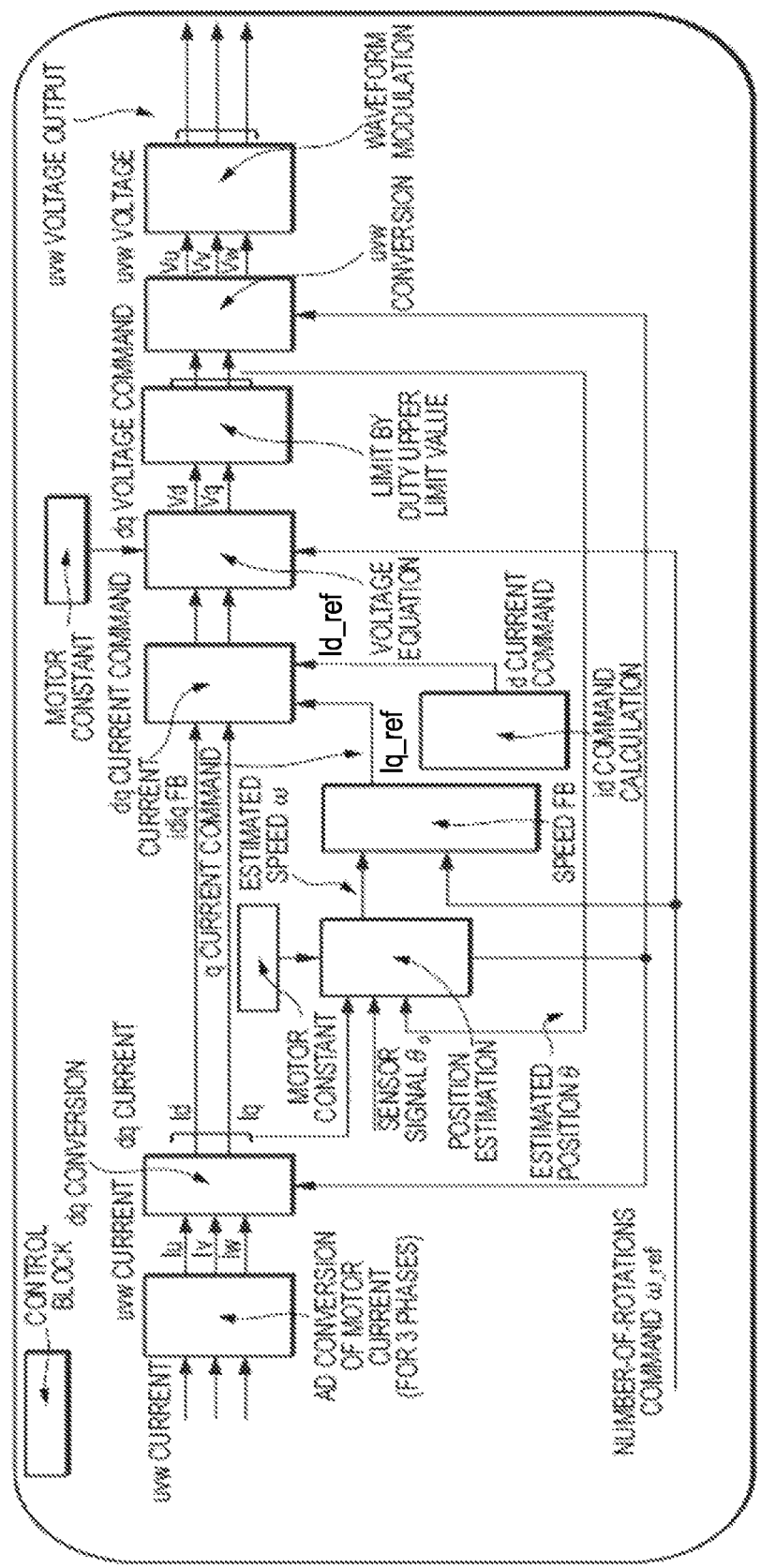
FIG. 11 is a block diagram for illustrating vector control of the motor by a controller of the air compressor according to the embodiment of the present invention.

Next, vector control and sensorless control of the motor 20 by the controller 30 will be described with reference to FIG. 11.

In the vector control, the current flowing through the stator windings 21a, 21b and 21c is separated into a magnetic flux direction of a permanent magnet as a field magnet and a direction orthogonal to the magnetic flux direction, and they are independently adjusted to control a magnetic flux and generated torque. For current control, a current value represented by a coordinate system (so-called d-q coordinate system) that rotates together with the rotor 22 of the motor 20 is used. A d-axis is the magnetic flux direction created by the permanent magnet attached to the rotor 22, and a q-axis is a direction orthogonal to the d-axis. q-axis current Iq, which is a q-axis component of the current flowing through the stator windings 21a, 21b and 21c, is a component (torque component current) that generates rotating torque, and d-axis current Id, which is the same d-axis component, is a component (exciting or magnetizing component current) that generates a magnetic flux.

The current detection circuits (U, V and W) of the current voltage detection circuit 34 detect currents Iu, Iv and Iw each flowing through each phase (U phase, V phase and W phase) of the motor 20. When the currents Iu, Iv and Iw are plotted in a graph with a rotation angle of the rotor 22 as a horizontal axis, three-phase sinusoidal waveforms whose phases are different from each other by 120 degrees are obtained. The currents Iu, Iv and Iw detected by the current detection circuit are A/D converted, and then converted into d-axis current Id and q-axis current Iq by uvw/dq coordinate conversion. For the calculation of the coordinate conversion herein, an estimated value of a rotational position θ of the rotor 22 obtained based on the voltage and current of the motor 20 and the like is used.

The estimation of the rotational position θ of the rotor 22 will be described. The controller 30 calculates a deviation angle (axis error) Δθ of the rotational position θ of the rotor 22 by using Equation (3) obtained based on Equation (1) of a d-axis induced voltage Ed and Equation (2) of a q-axis induced voltage Eq, and performs a PI compensation calculation to set the axis error Δθ to zero (target value), thereby estimating a rotating speed ω of the motor 20 and estimating the rotational position θ of the rotor 22 from integration of the rotating speed co.

[Formula 1]

$$Ed = Vd - R \cdot Id + \omega \cdot Lq \cdot Iq \quad (1)$$

$$Eq = Vq - R \cdot Iq - \omega \cdot Lq \cdot Id \quad (2)$$

$$\Delta\theta = \tan^{-1}\left(\frac{Vd - R \cdot Id + \omega \cdot Lq \cdot Iq}{Vq - \omega \cdot Lq \cdot Id - R \cdot Iq}\right) \quad (3)$$

In this way, the controller 30 of the present embodiment performs sensorless control of estimating the rotational position of the rotor 22 without using an expensive device such as an encoder.

The controller 30 calculates a q-axis current command value Iq_ref by performing a proportional integral (PI) calculation based on a difference between the estimated rotating speed ω and a number-of-rotations command value co ref, and performs a specific calculation to set a d-axis current command value Id_ref (for example, to set Id_ref to a negative value when it is necessary to perform field weakening control, and to set Id_ref to 0 in other cases). Then, the controller 30 obtains output voltage command values Vd and Vq represented in the d-q coordinate system based on the d-axis current command value Id_ref and the q-axis current command value Iq_ref, the d-axis current Id and the q-axis current Iq, the number-of-rotations command value ω_ref, and the voltage equation.

The controller 30 limits the voltage command values Vd and Vq obtained in this way by a predetermined duty upper limit value, and then converts the same into voltage command values Vu, Vv and Vw of each phase. Also in the calculation of the coordinate conversion, the estimated rotational position θ is used (the voltage command value Vd is also used to estimate the rotational position θ, as described above). Thereafter, the controller 30 forms a pulse width modulated gate driving signal for supplying a voltage matching each of the phase voltage command values Vu, Vv and Vw. The gate driving signal formed in this way is applied to a gate of each switching element configuring the inverter circuit 33, whereby a PWM-modulated three-phase AC voltage matching each of the phase voltage command values Vu, Vv and Vw is generated and is applied to each of the stator windings 21a, 21b and 21c of the motor 20.

In this configuration, the controller 30 performs feedback control by the proportional integral (PI) calculation, and the d-axis current Id and the q-axis current Iq are each controlled to match the d-axis current command value Id_ref and the q-axis current command value Iq_ref. The rotating speed estimation value ω as the control result is fed back, and the controller 30 converges the deviation Δω to zero by the proportional integral calculation. As a result, the rotating speed ω is made to match the command value ω_ref.

By adopting such vector control, it is possible to suppress harmonic components that are generated in the 120° energization control of the related art. That is, in the 120° energization control of the related art, energization is switched several times during one rotation of the motor, and harmonic components are thus generated. For example, if the number of rotations of the motor is 2200 rpm (about 36 Hz), a fundamental wave component is switched five times during one rotation because there are 5 pairs of N and S poles in the case of 10 poles, for example, so becomes 36×5=180 (Hz). Such a fundamental wave component also occurs in the vector control in the present embodiment. However, in the 120° energization control of the related art, in the case of 10 poles, the switching occurs 30 times during one rotation, so the harmonic component of 36×30=about 1100 (Hz) appears. Since such a harmonic component of about 1100 Hz is close to a structural resonance point of the air compressor 1, it causes resonance and is likely to increase the generated sound. In contrast, when the vector control as in the present embodiment is adopted, since the generation of such a harmonic component can be suppressed, it becomes possible to suppress the increase in generated sound due to resonance.

On the other hand, it is known that when sensorless control is adopted, a difference (the above-described axis error Δθ) occurs between the actual rotational position θ0 of the rotor 22 and the estimated rotational position θ of the rotor 22. In particular, in the air compressor 1 according to the present embodiment, since large load variation occur when performing a cycle of introducing air into the compression mechanism 10, compressing the air, and discharging compressed air, if the sensorless control is adopted for control of the motor 20, there is a concern that such an axis error Δθ may easily occur. However, since the outer rotor motor is used as the motor 20 in the present embodiment, it is possible to suppress the axis error Δθ of the vector control by increasing the inertia of the rotor 22.

That is, although the axis error Δθ is calculated by Equation (3) described above, the rotor 22 (outer rotor) of the motor 20 in the present embodiment has a large moment of inertia, so that the rotational acceleration becomes smaller, resulting in smaller amounts of change in the rotating speed ω and currents Id and Iq of the motor 20. Then, in the denominator of Equation (3) in which the term including the multiplication of the rotating speed ω and the current Id is negative, a value of the negative term becomes smaller, so a value of the denominator becomes larger. In the numerator of Equation (3) in which the term including the multiplication of the rotating speed ω and the current Iq is positive, a value of the positive term becomes smaller, a value of the numerator becomes smaller. As a result, the value of the axis error Δθ becomes also smaller. In this way, by adopting the outer rotor motor as the motor 20, it is possible to suppress the axis error Δθ between the actual rotational position $\theta_O$ of the rotor 22 and the estimated rotational position θ of the rotor 22.

Further, even when the axis error Δθ gradually increases due to the load variation, the controller 30 can appropriately correct the estimated position of the rotor 22, based on the sensor signal (a signal indicating the actual rotational position $\theta_O$ of the rotor 22) output from the position sensor 40 provided for the stator 21 or the sensor signal output from the thermistor 50 provided for each of the stator windings 21a, 21b and 21c of the stator 21. Therefore, it is possible to stabilize the rotation of the motor 20 in an efficient state (i.e., without reducing the number of rotations (discharge amount) of the motor 20) even under load variation.

In the air compressor 1 according to the embodiment described above, since the motor 20 is controlled by the vector control (i.e., the voltage applied to the stator windings 21a, 21b and 21c is adjusted based on the position information of the rotor 22 or the induced current flowing through the stator windings 21a, 21b and 21c of the stator 21, or the current flowing through the stator windings 21a, 21b and 21c is separated into a current component for generating rotating torque and a current component for generating a magnetic flux in the rotor 22, which are adjusted independently), the harmonic component that is generated in the 120° energization control of the related art can be suppressed. Therefore, it is possible to suppress generated sound while increasing a discharge amount of the air compressor 1. In addition, since the outer rotor motor is used as the motor 20 that drives the compression mechanism 10, the inertia of the motor 20 can be increased to suppress the axis error occurring in the vector control (sensorless control). Therefore, the rotation of the motor 20 can be stabilized even in the air compressor 1 with large load variation. That is, by adopting both the vector control and the outer rotor motor, it is possible to suppress generated sound while increasing a discharge amount of the air compressor 1, and to stabilize the rotation of the motor.

Further, in the air compressor 1 according to the embodiment described above, since the position of the rotor 22 can be estimated based on the voltage and current of the motor 20, it is not necessary to separately provide a device such as an encoder for measuring the position of the rotor 22. Therefore, it is possible to suppress an increase in size of the air compressor 1. Further, since the outer rotor motor is adopted as the motor 20, it is possible to suppress the axis error Δθ (difference between the actual position $\theta_O$ of the rotor and the estimated position θ of the rotor) of the vector control, which has been already described above.

Further, in the air compressor 1 according to the embodiment described above, based on the detection position signal of the rotor 22 output from the position sensor 40, the estimated position θ of the rotor 22 obtained based on the voltage and current can be corrected. Therefore, even when the difference (axis error Δθ) between the estimated position θ of the rotor 22 and the actual position $\theta_O$ of the rotor increases due to, for example, the load variation of the air compressor 1, the estimated position of the rotor 22 can be corrected appropriately based on the position information of the rotor 22 obtained by the position sensor resulting in ensuring the stabilization of motor rotation.

Further, in the air compressor 1 according to the embodiment described above, based on the temperature signal of the motor 20 output from the thermistor (temperature sensor) 50, the estimated position θ of the rotor 22 obtained based on the voltage and current can be corrected. Therefore, even when the difference (axis error Δθ) between the estimated position θ of the rotor 22 and the actual position $θ_0$ of the rotor increases due to, for example, the load variation of the air compressor 1, the estimated position θ of the rotor can be corrected appropriately based on the temperature information obtained by the thermistor 50, resulting in ensuring the stabilization of motor rotation.

Further, in the air compressor 1 according to the embodiment described above, since at least a part of the permanent magnet of the rotor 22 is made from the neodymium magnet with high magnetic force, it is possible to increase torque by increasing the force acting per an air gap area and to achieve high efficiency.

Further, in the air compressor 1 according to the embodiment described above, since the dimension of the outermost diameter of the rotor 22 is set within the range of 110 mm to 160 mm, inertial energy sufficient to cancel compression load can be obtained while suppressing an increase in size of the air compressor 1.

The present invention is not limited to the above embodiment, and embodiments in which appropriate design changes are made to the above embodiment by one skilled in the art are also included in the scope of the present invention as long as they have the features of the present invention. That is, the respective elements included in the above embodiment and arrangements, materials, conditions, shapes, sizes, and the like thereof are not limited to those illustrated and can be changed as appropriate. In addition, the respective elements included in the above embodiment can be combined to the extent technically possible, and combinations thereof are also included in the scope of the present invention as long as they include the features of the present invention.

The present disclosure includes the following aspects as examples of the invention.

A first air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to adjust a voltage applied to a stator winding of the stator, based on position information of the rotor. A waveform of current flowing through the stator winding is substantially a sinusoidal waveform.

A second air compressor according to the present invention includes a motor configured to drive a compression mechanism for compressing air, and a controller configured to control the motor, in which the motor is an outer rotor motor including a stator and a rotor disposed on an outer side of the stator, and in which the controller includes a detection circuit configured to detect induced current flowing through a stator winding of the stator and is configured to adjust a voltage applied to the stator winding, based on the induced current detected by the detection circuit. A waveform of current flowing through the stator winding is substantially a sinusoidal waveform.

A third air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to separate current flowing through a stator winding of the stator into a current component for generating rotating torque and a current component for generating a magnetic flux in the rotor, and is configured to adjust the current components independently. In this case, the controller may be configured to adjust a voltage applied to the stator winding, based on position information of the rotor. A waveform of current flowing through the stator winding is substantially a sinusoidal waveform.

A fourth air compressor according to the present invention includes a motor configured to drive a compression mechanism for compressing air, and a controller configured to control the motor, in which the motor is an outer rotor motor including a stator and a rotor disposed on an outer side of the stator, and in which the controller is configured to control the motor by vector control.

When such a configuration is adopted, the motor is controlled by the vector control (i.e., the voltage applied to the stator winding is adjusted based on the position information of the rotor or the induced current flowing through the stator winding of the stator, or the current flowing through the stator winding is separated into a current component for generating rotating torque and a current component for generating a magnetic flux in the rotor, which are adjusted independently), so that a harmonic component that is generated in energization control of the related art can be suppressed. Therefore, it is possible to suppress generated sound while increasing a discharge amount of the air compressor. In addition, since the outer rotor motor is used as the motor that drives the compression mechanism, the inertia of the rotor can be increased, so that rotation of the motor can be stabilized even in the air compressor with large load variation. That is, in the air compressor in which large load variation occurs when performing a cycle of introducing air into the compression mechanism, compressing the air, and discharging compressed air, it tends to be difficult to accurately perceive a position of the rotor. However, since the outer rotor motor is used as the motor, the inertia of the rotor can be increased to suppress an axis error of the vector control. Thus, in the present invention, by adopting both the vector control and the outer rotor motor, it is possible to suppress generated sound while increasing a discharge amount of the air compressor, and to stabilize rotation of the motor.

In the first to third air compressors of the present invention, the controller can be configured to estimate the position information, based on induced current flowing through the stator winding. In the fourth air compressor according to the present invention, the controller can be configured to perform sensorless control of estimating a position of the rotor, based on a voltage and current of the motor.

When such a configuration is adopted, the position of the rotor can be estimated based on the voltage and current of the motor or the induced current flowing through the stator winding of the stator, so that there is no need to separately provide a device such as an encoder for measuring the position of the rotor. Therefore, it is possible to suppress an increase in size of the air compressor. Further, since the outer rotor motor is adopted as the motor, it is possible to suppress the axis error (difference between an actual position of the rotor and an estimated position of the rotor) of the vector control.

In the first to fourth air compressors according to the present invention, a position sensor configured to detect a position of the rotor and to output a detection position signal may be provided. In this case, the controller can be configured to correct the position information (or an estimated position of the rotor), based on the detection position signal output from the position sensor.

When such a configuration is adopted, the estimated position of the rotor obtained based on the voltage and current can be corrected based on the detection position signal of the rotor output from the position sensor. Therefore, even when the difference (axis error) between the estimated position of the rotor and the actual position of the rotor becomes large due to, for example, load variation of the air compressor, the estimated position of the rotor can be corrected appropriately based on the position information of the rotor obtained by the position sensor, resulting in ensuring the stabilization of motor rotation.

In the first to fourth air compressors according to the present invention, a temperature sensor configured to detect a temperature of the motor and to output a temperature signal may be provided. In this case, the controller can be configured to correct the position information (or an estimated position of the rotor), based on the temperature signal output from the temperature sensor.

When such a configuration is adopted, the estimated position of the rotor obtained based on the voltage and current can be corrected based on the temperature signal of the motor output from the temperature sensor. Therefore, even when the difference (axis error) between the estimated position of the rotor and the actual position of the rotor becomes large due to, for example, load variation of the air compressor, the estimated position of the rotor can be corrected appropriately based on the temperature information of the motor obtained by the temperature sensor, resulting in ensuring the stabilization of motor rotation.

In the first to fourth air compressors according to the present invention, the rotor may have a permanent magnet, and at least a part of the permanent magnet may be made from a neodymium magnet.

When such a configuration is adopted, since at least a part of the permanent magnet of the rotor is made from the neodymium magnet with high magnetic force, it is possible to increase torque by increasing the force acting per an air gap area and to achieve high efficiency.

In the first to fourth air compressors according to the present invention, a dimension of an outermost diameter of the rotor may be set within a range of 110 mm to 160 mm.

When such a configuration is adopted, inertial energy sufficient to cancel compression load can be obtained while suppressing an increase in size of the air compressor.

According to the present invention, it is possible to suppress generated sound while increasing a discharge amount of the air compressor.

What is claimed is:

1. An air compressor comprising:
   a motor configured to drive a compression mechanism for compressing air,
   a controller configured to control the motor, and
   a temperature sensor configured to detect a temperature of the motor and to output a temperature signal,
   wherein the motor is an outer rotor motor comprising a stator and a rotor disposed on an outer side of the stator,
   wherein the controller is configured to adjust a voltage applied to a stator winding of the stator, based on position information of the rotor, and
   wherein the controller is configured to correct the position information, based on the temperature signal output from the temperature sensor.

2. The air compressor according to claim 1, wherein the compression mechanism has a cylinder and a piston provided in the cylinder, and is configured to cause the piston to reciprocate by the motor to compress air supplied into the cylinder.

3. An air compressor comprising:
   a motor configured to drive a compression mechanism for compressing air, and
   a controller configured to control the motor,
   wherein the motor is an outer rotor motor comprising a stator and a rotor disposed on an outer side of the stator, and
   wherein the controller is configured to adjust a voltage applied to a stator winding of the stator, based on position information of the rotor,
   the air compressor further comprising a position sensor configured to detect a position of the rotor and to output a detection position signal,
   wherein the controller is configured to correct the position information, based on the detection position signal output from the position sensor.

4. The air compressor according to claim 1, wherein a waveform of current flowing through the stator winding is substantially a sinusoidal waveform.

5. An air compressor comprising:
   a motor configured to drive a compression mechanism for compressing air, and a controller configured to control the motor,
   wherein the motor is an outer rotor motor comprising a stator and a rotor disposed on an outer side of the stator,
   wherein the controller is configured to adjust a voltage applied to a stator winding of the stator, based on position information of the rotor,
   wherein the controller is configured to control the motor by vector control,
   wherein the controller is configured to perform sensorless control of estimating a position of the rotor, based on a voltage and current of the motor,
   wherein the air compressor further comprises:
      a position sensor configured to detect a position of the rotor and to output a detection position signal, and
   wherein the controller is configured to correct an estimated position of the rotor, based on the detection position signal output from the position sensor.

6. An air compressor comprising: a motor configured to drive a compression mechanism for compressing air;
   a controller configured to control the motor; and
   a temperature sensor configured to detect a temperature of the motor and to output a temperature signal,
   wherein the motor is an outer rotor motor comprising a stator and a rotor disposed on an outer side of the stator,
   wherein the controller is configured to adjust a voltage applied to a stator winding of the stator, based on position information of the rotor,
   wherein the controller is configured to control the motor by vector control,
   wherein the controller is configured to perform sensorless control of estimating a position of the rotor, based on a voltage and current of the motor,
   wherein the controller is configured to correct an estimated position of the rotor, based on the temperature signal output from the temperature sensor,
   wherein the controller is configured to adjust a voltage applied to a stator winding of the stator, based on position information of the rotor, and
   wherein a dimension of an outermost diameter of the rotor is set within a range of 110 mm to 160 mm.

7. An air compressor comprising:
   a motor configured to drive a compression mechanism for compressing air, and
   a controller configured to control the motor,
   wherein the motor is an outer rotor motor comprising a stator and a rotor disposed on an outer side of the stator, wherein the controller is configured to adjust a voltage applied to a stator winding of the stator, based on position information of the rotor, and wherein the rotor has a permanent magnet, and at least a part of the permanent magnet is made from a neodymium magnet.

8. An air compressor comprising:

a motor configured to drive a compression mechanism for compressing air, and a controller configured to control the motor, wherein the motor is an outer rotor motor comprising a stator and a rotor disposed on an outer side of the stator, wherein the controller is configured to adjust a voltage applied to a stator winding of the stator, based on position information of the rotor, and wherein a dimension of an outermost diameter of the rotor is set within a range of 110 mm to 160 mm.

* * * * *